United States Patent [19]

Watanabe

[11] Patent Number: 5,272,527
[45] Date of Patent: Dec. 21, 1993

[54] PICTURE IMAGE MONITORING SYSTEM

[75] Inventor: Tsuyoshi Watanabe, Saitama, Japan

[73] Assignee: Pioneer Electronic Corporation, Tokyo, Japan

[21] Appl. No.: 862,506

[22] Filed: Apr. 2, 1992

[30] Foreign Application Priority Data

Aug. 29, 1991 [JP] Japan ................... 3-218311

[51] Int. Cl.[5] .................. H04N 7/18; H04N 7/133
[52] U.S. Cl. .................... 358/108; 358/105; 358/133; 379/53
[58] Field of Search .......... 358/108, 133, 105; 379/53

[56] References Cited

U.S. PATENT DOCUMENTS 5,097,328  3/1992  Boyette ..................... 358/108
5,103,306  4/1992  Weiman ..................... 358/133
5,150,212  9/1992  Han ......................... 358/108

Primary Examiner—Howard W. Britton
Attorney, Agent, or Firm—Sughrue, Mion, Zinn, Macpeak & Seas

[57] ABSTRACT

A picture image monitoring system wherein picture images of a plurality of monitoring object areas and difference degree information indicative of a rate of a picture image change of each monitoring object area can be transmitted efficiently to a remote location by way of a communication channel and a monitoring operation of the monitoring object areas can be performed accurately and efficiently at the remote location. A transmitting side terminal apparatus and a receiving side terminal apparatus are interconnected by a communication channel. At the transmitting side terminal apparatus, a picture image signal of a monitoring object area photographed is compressed while difference degree information and an identifier are produced, and they are transmitted to the receiving side terminal apparatus by way of a communication line. At the receiving side terminal apparatus, received compressed picture image data, difference degree information and an identifier are used to effect detection of a picture image change of a monitoring object area and desired monitoring control.

7 Claims, 10 Drawing Sheets

FIG. 4

| u\v | 0 | 1 | 2 | 3 | 4 | 5 | 6 | 7 |
|---|---|---|---|---|---|---|---|---|
| 0 | 16 | 11 | 10 | 16 | 24 | 40 | 51 | 61 |
| 1 | 12 | 12 | 14 | 19 | 26 | 58 | 60 | 55 |
| 2 | 14 | 13 | 16 | 24 | 40 | 57 | 69 | 56 |
| 3 | 14 | 17 | 22 | 29 | 51 | 87 | 80 | 62 |
| 4 | 18 | 22 | 37 | 58 | 68 | 109 | 103 | 77 |
| 5 | 24 | 35 | 55 | 64 | 81 | 104 | 113 | 92 |
| 6 | 49 | 64 | 78 | 87 | 103 | 121 | 120 | 101 |
| 7 | 72 | 92 | 95 | 98 | 112 | 100 | 103 | 99 |

FIG. 5

| u\v | 0 | 1 | 2 | 3 | 4 | 5 | 6 | 7 |
|---|---|---|---|---|---|---|---|---|
| 0 | 17 | 18 | 24 | 47 | 66 | 99 | 99 | 99 |
| 1 | 18 | 21 | 26 | 66 | 99 | 99 | 99 | 99 |
| 2 | 24 | 26 | 56 | 99 | 99 | 99 | 99 | 99 |
| 3 | 47 | 66 | 99 | 99 | 99 | 99 | 99 | 99 |
| 4 | 99 | 99 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |

ZIGZAG SCANNING

HUFFMAN CODING TABLE

| Code Length | Index Value | Code |
|---|---|---|
| 1 | 1<br>-1 | 1<br>0 |
| 2 | 3<br>2<br>-2<br>-3 | 11<br>10<br>01<br>00 |
| 3 | 7<br>6<br>5<br>4<br>-4<br>-5<br>-6<br>-7 | 111<br>110<br>101<br>100<br>011<br>010<br>001<br>000 |
| ⋮ | ⋮ | ⋮ |

| Code Length | Index Value | Code |
|---|---|---|
| 10 | 1023<br>1022<br>1021<br>1020<br>1019<br>1018 | 11 11 11 11 11<br>11 11 11 11 10<br>11 11 11 11 01<br>11 11 11 11 00<br>11 11 11 10 11<br>11 11 11 10 10 |
|  | ⋮ | ⋮ |
|  | -1018<br>-1019<br>-1020<br>-1021<br>-1022<br>-1023 | 00 00 00 01 01<br>00 00 00 01 00<br>00 00 00 00 11<br>00 00 00 00 10<br>00 00 00 00 01<br>00 00 00 00 00 |

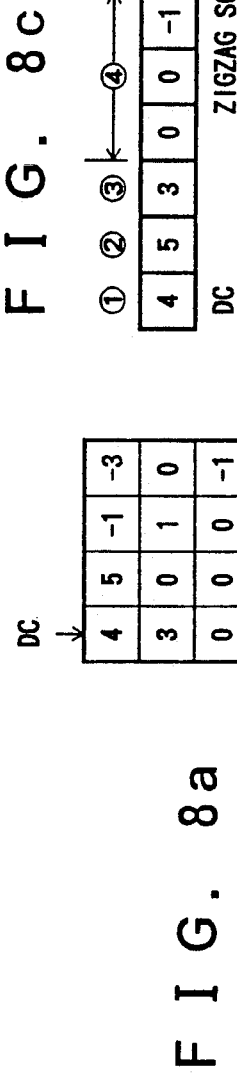
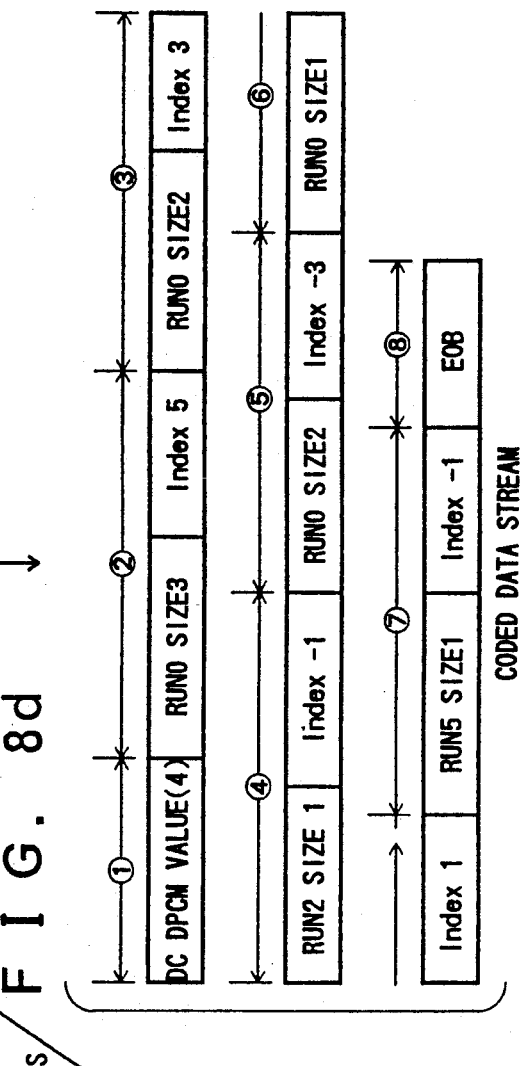
FIG. 8a
FIG. 8b
FIG. 8c
FIG. 8d

FIG. 11a  FIG. 11b
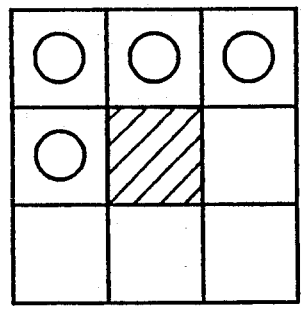
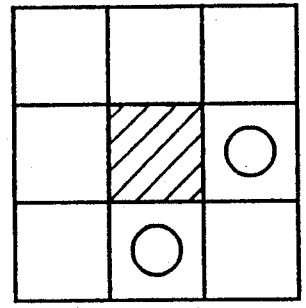
FIG. 12a  FIG. 12b  FIG. 12c
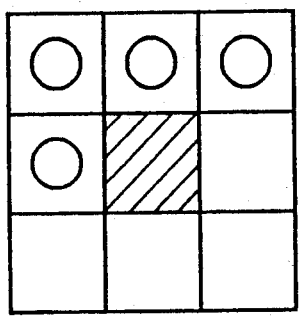
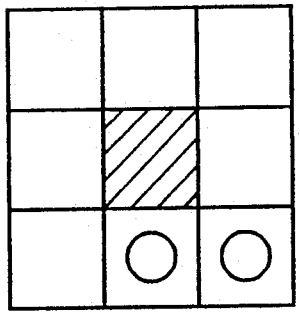
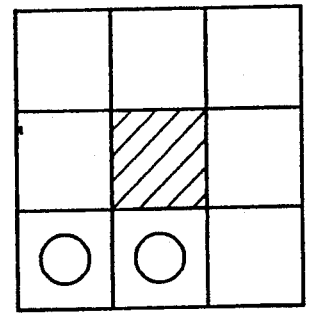
FIG. 12d
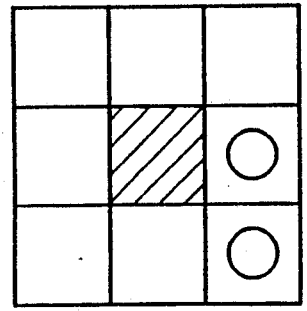

PICTURE IMAGE MONITORING SYSTEM

BACKGROUND OF THE INVENTION

1. Field of the Invention

This invention relates to a picture image monitoring system for monitoring a change of a picture image of a monitoring object area, and more particularly to a picture image monitoring system which can effect a monitoring operation from a remote location by way of a communication channel.

2. Description of the Prior Art

An exemplary one of conventional picture image monitoring systems of the type mentioned above is a monitoring camera system for the prevention of crimes. One of such conventional monitoring camera systems is shown in FIG. 14. Referring to FIG. 14, the monitoring camera system shown includes a video camera positioned to photograph a monitoring object area, and a TV (television) monitor and a video tape recorder (VTR) both connected to the video camera. A picture image of the monitoring object area is photographed by the video camera and recorded by the VTR while it is displayed on the TV monitor. A watching operation of the TV monitor and a judging operation for occurrence of an abnormal condition are performed by a watchman.

In this manner, with a conventional monitoring camera system for the prevention of crimes or a like monitoring system, a watching operation of a screen and a judging operation for occurrence of an abnormal condition all rely upon manual operation. Consequently, there is a problem that the accuracy in monitoring depends to a great extent upon fatigue or increase in stress of a watchman or upon a difference in capacity between individual watchman. Further, where manual operation is relied upon, the detecting accuracy is high for such a great change of a picture image that occurs over an entire screen, but it is a problem that a change of a picture image which occurs at a limited portion of a screen is likely overlooked. It is another problem that, as the number of monitoring object areas increases, the monitoring accuracy is deteriorated to a great extent.

SUMMARY OF THE INVENTION

It is an object of the present invention to provide a picture image monitoring system which can transmit picture images of a plurality of monitoring object areas and difference degree information indicative of rates of change of picture images of the monitoring object areas at a high efficiency to a remote location by way of a communication channel so that a monitoring operation at the remote location can be performed accurately at a high efficiency.

In order to attain the object, according to the present invention, there is provided a picture image monitoring system, which comprises a transmitting side terminal apparatus and a receiving side terminal apparatus connected to each other by way of a communication channel, the transmitting side terminal apparatus including a plurality of image pickup means for photographing individual monitoring object areas, a picture image signal selecting section for selecting one of picture image signals of the monitoring object areas photographed by the image pickup means, a picture image data compressing section for compressing a picture image signal of a monitoring object area selected by the picture image signal selecting section, a picture image change detecting section for detecting, from a picture image signal of a monitoring object area selected by the picture image signal selecting section, a change of the picture image of the monitoring object area to produce difference degree information indicative of a degree of a difference of the picture image of the monitoring object area and an identifier which specifies the monitoring object area then, and a communication circuit for transmitting difference degree information and an identifier outputted from the picture image change detecting section and compressed picture image data of a monitoring object area outputted from the picture image data compressing section to the receiving side terminal apparatus by way of the communication channel and for receiving controlling information for the picture image monitoring transmitted thereto from the receiving side terminal apparatus by way of the communication channel, the receiving side terminal apparatus including a communication circuit for receiving difference degree information and an identifier as well as compressed picture image data of a monitoring object area transmitted thereto from the transmitting side terminal apparatus by way of the communication channel and for transmitting controlling information for the picture image monitoring to the transmitting side terminal apparatus by way of the communication channel, a compressed data decoding section for decoding compressed picture image data received from the communication circuit into an original picture image, a controlling information generating section for producing predetermined controlling information for the picture image monitoring in accordance with difference degree information and an identifier received from the communication circuit, and a picture image displaying section for displaying a picture image of a monitoring object area decoded by the compressed data decoding section in accordance with controlling information outputted from the controlling information generating section.

In the picture image monitoring system, the image pickup means of the transmitting side terminal apparatus may be installed such that they are individually directed toward the respective predetermined monitoring object areas to photograph them, and picture image signals photographed by the image pickup means are successively selected at a predetermined interval of time by the picture image signal selecting section.

The picture image data compressing section compresses the picture image signal of a monitoring object area selected by the picture image signal selecting section in accordance with a predetermined data compressing technique. Meanwhile, the picture image change detecting section may compare the picture image of the current monitoring object area received from the picture image signal selecting section with a preceding picture image of the same monitoring object area to detect a change of the picture image, and produces difference degree information indicative of a degree of such change of the picture image as well as an identifier which specifies the monitoring object area then.

Such difference degree information and identifier from the picture image change detecting section and compressed picture image data from the picture image data compressing section are transmitted to the communication circuit of the transmitting side terminal apparatus, from which they are transmitted to the receiving side terminal apparatus by way of the communication channel.

The communication circuit of the receiving side terminal apparatus receives such difference degree information and identifier as well as compressed picture image data transmitted thereto from the transmitting side terminal apparatus. The compressed data decoding section decodes the compressed picture image data back into an original picture image signal and sends the original picture image signal to the picture image displaying section. Meanwhile, the controlling information generating section produces predetermined controlling information in accordance with such difference degree information and identifier received from the communication circuit of the receiving side terminal apparatus and sends it to the picture image displaying section. Further, when necessary, the controlling signal generating section sends such controlling information also to the transmitting side terminal apparatus by way of the communication channel so that predetermined picture image monitoring control may be executed.

For example, the controlling information generating section may transmit, to the picture image displaying section, controlling information to effect switching on or off of a monitor switch such that, when a change of a picture image is detected, the monitor switch is automatically switched on to display a picture image of the monitoring object area on a screen of the picture image displaying section. On the other hand, the controlling information generating section may transmit, to the transmitting side terminal apparatus, controlling information to command transmission only of a picture image of the monitoring object area in which the change of the picture image has occurred.

Thus, with the picture image monitoring system, a superior effect can be achieved that picture images of a plurality of monitoring object areas and difference degree information indicative of a rate of picture image change of each of the monitoring object areas can be transmitted efficiently to a remote location by way of the communication channel and a monitoring operation can be performed accurately with a high degree of accuracy at the remote location.

The above and other objects, features and advantages of the present invention will become apparent from the following description and the appended claims, taken in conjunction with the accompanying drawings.

BRIEF DESCRIPTION OF THE DRAWINGS

FIG. 4 is a diagrammatic view showing a Y component quantizing table;

FIG. 5 is a similar view but showing a C component quantizing table;

FIGS. 8a to 8d are views illustrating data compressing processing for a picture image signal;

FIGS. 11a and 11b are diagrammatic views illustrating noise removing processing;

FIGS. 12a to 12d are similar views but illustrating another noise removing processing;

DESCRIPTION OF THE PREFERRED EMBODIMENT

Figure 1:
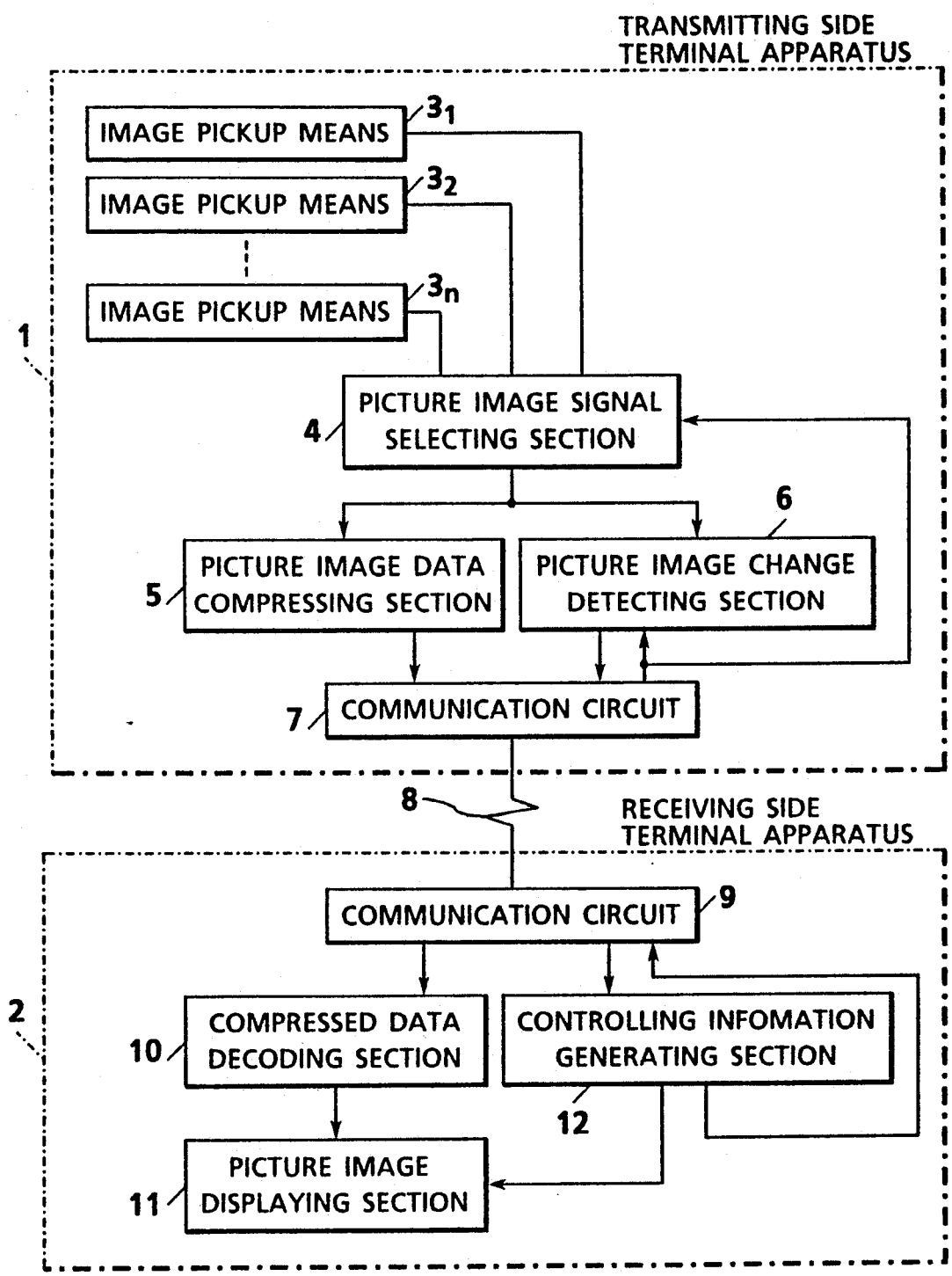
FIG. 1 is a block diagram showing a fundamental construction of a picture image monitoring system according to the present invention.

Referring first to FIG. 1, there is shown a fundamental construction of a picture image monitoring system according to the present invention. The picture image monitoring system shown includes a set of a transmitting side terminal apparatus 1 and a receiving side terminal apparatus 2 connected to each other by way of a communication channel 8.

The transmitting side terminal apparatus 1 includes a plurality of image pickup means $3_1$ to $3_n$ for photographing respective monitoring object areas, a picture image signal selecting section 4 for selecting one of picture image signals of the monitoring object areas photographed by the image pickup means $3_1$ to $3_n$, a picture image data compressing section 5 for compressing a picture image signal of a monitoring object area selected by the picture image signal selecting section 4, a picture image change detecting section 6 for monitoring, from a picture image signal of a monitoring object area selected by the picture image signal selecting section 4, a change of the picture image of the monitoring object area to produce and output therefrom difference degree information indicative of a degree of the change of the picture image of the monitoring object area and an identifier which identifies the monitoring object area then, and a communication circuit 7 for transmitting difference degree information and an identifier outputted from the picture image change detecting section 6 and compressed picture image data of a monitoring object area outputted from the picture image data compressing section 5 to the receiving side terminal apparatus 2 by way of the communication channel 8 and for receiving controlling information for the monitoring of picture image transmitted thereto from the receiving side terminal apparatus 2 by way of the communication channel 8.

Meanwhile, the receiving side terminal apparatus 2 includes a communication circuit 9 for receiving difference degree information and an identifier as well as compressed picture image data of a monitoring object area transmitted thereto from the transmitting side terminal apparatus 1 by way of the communication channel 8 and for transmitting therefrom controlling information for the monitoring of a picture image to the transmitting side terminal apparatus 1 by way of the communication channel 8, a compressed data decoding section 10 for decoding compressed picture image data received by the communication circuit 9 back into an original picture image, a controlling information generating section 12 for producing predetermined controlling information for the picture image monitoring in accordance with difference degree information and an identifier received by the communication circuit 9, and a picture image displaying section 11 for displaying a picture image of a monitoring object area obtained by decoding by the compressed data decoding section 10 in accordance with controlling information produced from the controlling information generating section 12.

The image pickup means $3_1$ to $3_n$ are installed such that they are individually directed toward respective predetermined monitoring object areas, and picture image signals photographed by the image pickup means $3_1$ to $3_n$ are successively selected at a predetermined interval of time by the picture image signal selecting section 4.

The picture image data compressing section 5 compresses a picture image signal of a monitoring object area selected by the picture image signal selecting section 4 in accordance with a predetermined data compressing technique. Meanwhile, the picture image change detecting section 6 compares the picture image of the current monitoring object area received from the picture image signal selecting section 4 with a preceding picture image of the same monitoring object area to monitor a change of the picture image, and produces difference degree information indicative of a degree of such change of the picture image and besides outputs an identifier which identifies the monitoring object area then.

Such difference degree information and identifier from the picture image change detecting section 6 and compressed picture image data from the picture image data compressing section 5 are transmitted to the communication circuit 7, from which they are transmitted to the receiving side terminal apparatus 2 by way of the communication channel 8.

The communication circuit 9 of the receiving side terminal apparatus 2 receives such difference degree information and identifier as well as compressed picture image data transmitted thereto from the transmitting side terminal apparatus 1. The compressed data decoding section 10 decodes the compressed picture image data back into an original picture image signal and sends the original picture image signal to the picture image displaying section 11. Meanwhile, the controlling information generating section 12 produces predetermined controlling information in accordance with such difference degree information and identifier received from the communication circuit 9 and sends it to the picture image displaying section 11. Further, when necessary, the controlling information generating section 12 sends such controlling information also to the transmitting side terminal apparatus 1 by way of the communication channel 8 so that predetermined picture image monitoring control may be executed.

For example, the controlling information generating section 12 may transmit to the picture image displaying section 11 controlling information to effect switching on or off of a monitor switch not shown such that, when a change of a picture image is detected, the monitor switch is automatically switched on to display a picture image of the monitoring object area on a screen of the picture image displaying section. On the other hand, the controlling information generating section 12 may transmit to the transmitting side terminal apparatus 1 controlling information to command transmission only of a picture image of the monitoring object area in which the change of the picture image has occurred.

Figure 2:
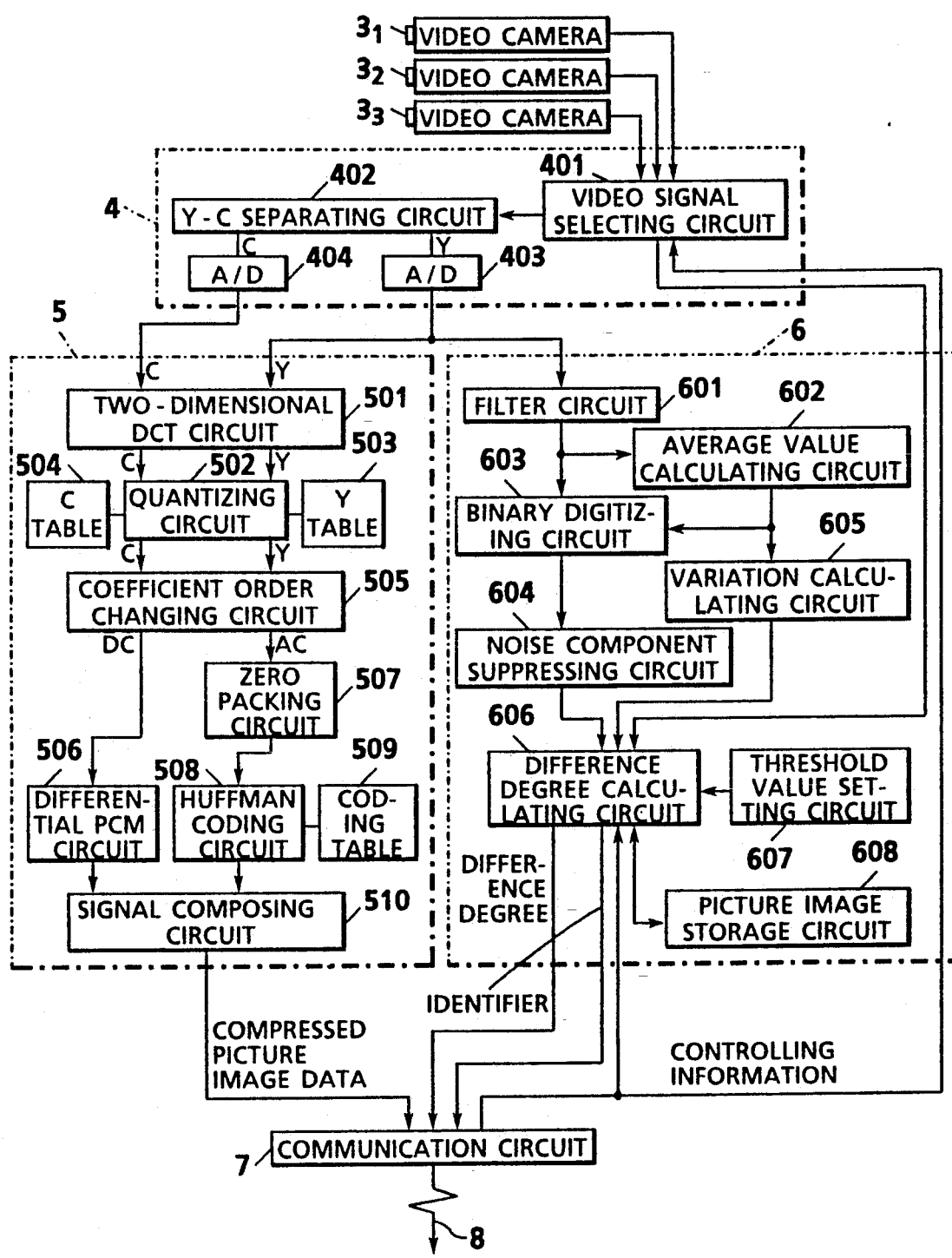
FIG. 2 is a block diagram showing a transmitting side terminal apparatus of a picture image monitoring system according to the present invention.
Figure 3:
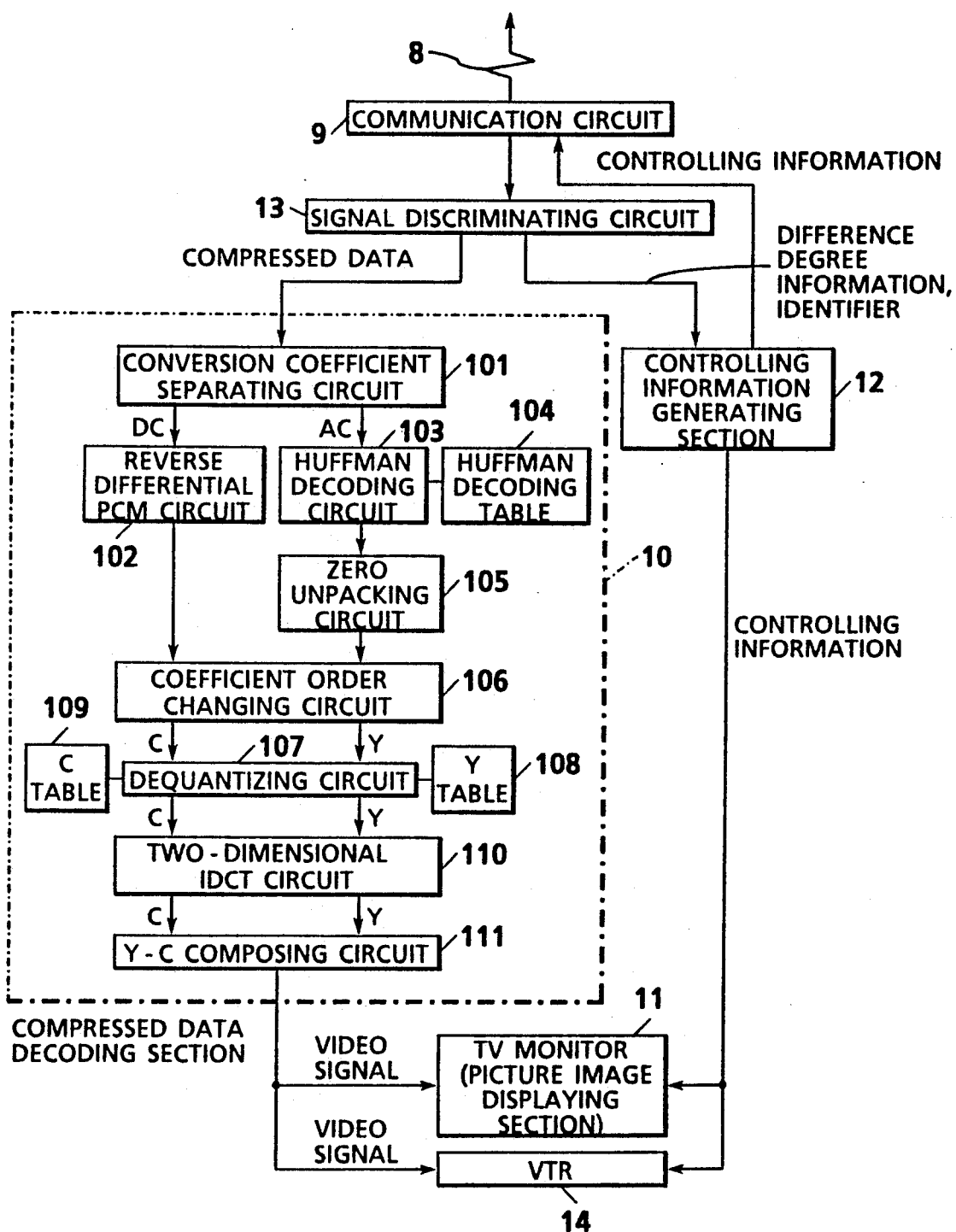
FIG. 3 is a block diagram showing a receiving side terminal apparatus of the picture image monitoring system.

A picture image monitoring apparatus according to a preferred embodiment of the present invention is shown in FIGS. 2 and 3 wherein FIG. 2 shows a transmitting side terminal apparatus of the picture image monitoring system and FIG. 3 shows a receiving side terminal apparatus of the picture image monitoring system.

Referring first to FIG. 2, the transmitting side terminal apparatus shown has a similar fundamental construction to that of the transmitting side terminal apparatus 1 shown in FIG. 1 and includes up to three video cameras $3_1$ to $3_3$ each serving as an image pickup means and disposed fixedly such that they are directed toward respective predetermined monitoring object areas so as to photograph the respective monitoring object areas. The transmitting side terminal apparatus further includes a picture image signal selecting section 4, a picture image data compressing section 5, a picture image change detecting section 6, and a communication circuit 7.

The picture image signal selecting section 4 includes a video signal selecting circuit 401 for selectively outputting video signals received from the video cameras $3_1$ to $3_3$ cyclically at a fixed period, a Y-separating circuit 402 for separating a video signal in the form of a color composite signal received from the video signal selecting circuit 401 into a Y (brightness) signal and a C (color difference) signal, and a pair of A/D (analog to digital) converters 403 and 404 for individually converting Y and C signals received from the Y-C separating circuit 402 from analog signals into digital signals.

The picture image data compressing section 5 includes a two-dimensional DCT (discrete cosine converting) circuit 501 for converting a Y signal and a C signal individually into orthogonal codes, a quantizing circuit 502, a Y component quantization table 503, a C component quantization table 504, a coefficient order changing circuit 505 for scanning quantized two-dimensional DCT conversion coefficients in a zigzag fashion to re-arrange them such that they from a low frequency component toward a high frequency component, a differential PCM (pulse code modulation) circuit 506 for converting a dc component of a two-dimensional DCT conversion coefficient into a DPCM (differential pulse code modulation) code, a zero packing circuit 507 for compressing terms of those of conversion coefficients which are equal to zero into corresponding codes, a Huffman coding circuit 508 for converting those conversion coefficients other than 0 into corresponding Huffman codes, a Huffman coding table 509, and a signal combining circuit 510 for combining a dc component and an ac component after such conversion into a block.

The picture image change detecting section 6 includes a filter circuit 601 for applying predetermined filtering processing to a Y signal received from the A/D converter 403 to extract a desired picture image characteristic portion of the Y signal, an average value calculating circuit 602 for calculating a picture element density average value of such extracted characteristic picture image, a binary digitizing circuit 603 for converting such extracted characteristic picture image into a binary picture image consisting of the binary values of "1" and "0" using a picture element density average value calculated by the average value calculating circuit 602 as a threshold value, a noise component suppressing circuit 604 for removing noise components from the binary picture image, a variation calculating circuit 605 for calculating a variation of the picture element density average value of the picture image at present from another picture element density average value of the picture image in the past, a difference degree calculating circuit 606 for producing difference degree information indicative of a degree of a change of a picture image of a monitoring object area and an identifier which identifies the monitoring object area then, a threshold value setting circuit 607 for setting a threshold value for the detection of a change of a picture image, and a picture image storage circuit 608 for storing therein a binary picture image of a frame.

The communication circuit 7 receives compressed picture image data from the signal combining circuit 510 of the picture image data compressing section 5 and a difference degree and an identifier from the difference degree calculating circuit 606 of the picture image change detecting section 6 and transmits the received information to the receiving side terminal apparatus 2 shown in FIG. 3 by way of the communication channel 8. The communication circuit 7 also receives controlling information from the receiving side terminal apparatus 2 by way of the communication channel 8 and sends the received controlling information to the difference degree calculating circuit 606 and also to the video signal selecting circuit 401 of the picture image signal selecting section 4. The communication channel 8 here may be any of the wire type and the wireless type.

In operation, video signals of the individual monitoring object areas photographed by the video cameras $3_1$ to $3_3$ are successively and cyclically selected by the video signal selecting circuit 401 and inputted to the Y-C separating circuit 402.

A video signal inputted to the Y-C separating circuit 402 is separated by the same into a Y (brightness) component and a C (color difference) component. The Y and C components thus obtained are then converted into digital signals by the A/D converters 403 and 404, respectively, and then transmitted to the two-dimensional DCT circuit 501, at which each of them is divided into blocks of an 8×8 picture element size and two-dimensional DCT is effected for each of such blocks.

In particular, the two-dimensional DCT circuit 501 stores a Y component and a C component of a video signal transmitted thereto from the Y-C separating circuit 402 once individually into frame memories not shown thereof, and for each of the signal components, a screen is divided into blocks of an 8×8 picture element size. Then, for each block of each of the Y and C components, two-dimensional DCT is performed, when a picture image signal of the block is given by f(i, j) (u, v=0, 1, ..., 7), in accordance with the following expression to calculate a total of 8×8=64 conversion coefficients F(u, v) for one block.

$$F(u, v) = \frac{1}{4} C(u)C(v) \sum_{i=0}^{7} \sum_{j=0}^{7} f(i, j) \cdot$$

$$\cos\left((2i+1) \cdot \frac{u\pi}{16}\right) \times \cos\left((2j+1) \cdot \frac{v\pi}{16}\right)$$

where $$C(0) = \frac{1}{\sqrt{2}}, \quad C(u) = C(v) = 1 \quad (u, v = 1, 2, \ldots, 7)$$

The total of 8×8=64 conversion coefficients F(u, v) for each block thus obtained are sent to the quantizing circuit 502, at which they are individually divided by quantization coefficients at corresponding positions of the Y component quantization table 503 of FIG. 4 or the C component quantization table 504 of FIG. 5 and the quotients are rounded at decimals thereof to quantize the conversion coefficients F(u, v). Consequently, redundancy of the signals is removed.

Figures 6, 7A, 7B:
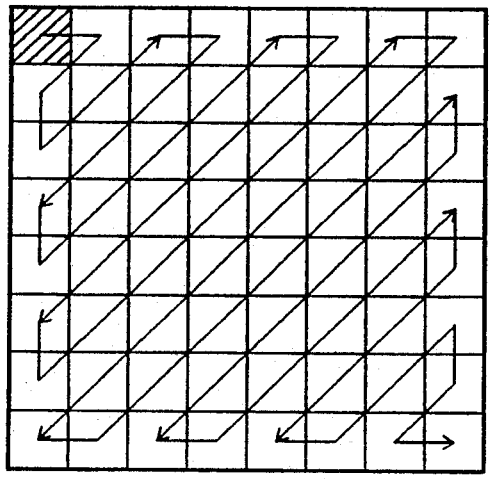
FIG. 6 is a diagram showing a manner of zigzag scanning.
FIGS. 7a and 7b are diagrammatic views showing a Huffman coding table.

The quantized conversion coefficients are scanned in a zigzag fashion as seen from FIG. 6 by the coefficient order changing circuit 505 so that the conversion coefficients are re-arranged from a lower one in frequency, using a dc component as a starting point, toward a higher one and are read out in the re-arranged order. It is to be noted that, in FIG. 6, a hatched portion at the left upper corner represents a dc component.

The dc component read out by such zigzag scanning is sent to the differential PCM circuit 506, at which a difference thereof from a dc component of a preceding block is calculated and a difference value thus obtained is converted into a DPCM code. Meanwhile, ac components read out subsequently to the dc component are sent to the zero packing circuit 507, at which those of them which have the coefficient 0 are zero packed in such a manner as hereinafter described, whereafter they are Huffman coded by the Huffman coding circuit 508.

An exemplary procedure of data compression processing by the picture image data compressing section 5 is illustrated in FIGS. 8a to 8d wherein a block has a 4×4 picture element size in order to facilitate description.

Referring to FIGS. 8a to 8d, the block shown in FIG. 8a includes a total of 4×4=16 conversion coefficients after quantization processing outputted from the quantizing circuit 502. The 16 conversion coefficients are zigzag scanned as illustrated in FIG. 8b by the coefficient order changing circuit 505 and outputted as a coefficient train in which they are arranged in such an order as seen from FIG. 8c.

A coefficient value "4" (at position ①) of the first dc component in the coefficient train of FIG. 8c read out by such zigzag scanning is subtracted from a dc component of a preceding block by the differential PCM circuit 506 to obtain a difference between them, and a difference value thus obtained is coded and outputted as a DPCM value. It is to be noted that, when the block being processed is the first block, since no preceding block exists, the coefficient value itself is coded and outputted as a DPCM value. FIGS. 8a to 8d shows the case of such first block, and the coefficient value "4" is coded as it is and outputted as a DPCM value (4) as indicated at the position ① of FIG. 8d.

On the other hand, as regards an ac component read out subsequently to the dc component, first a number of consecutive terms of the coefficient "0" is coded with a code "RUN" by the zero packing circuit 507, and then the other terms of the other coefficients than zero are converted into Huffman codes by the Huffman coding circuit 508 so that they are each replaced by a code bit length "SIZE" and a Huffman code "Index" after conversion.

For example, as regards, for example, the first coefficient value "5" (at position ②) of the ac components in FIG. 8c, the value thereof is not equal to 0, and consequently, the RUN code is "RUN0" which represents that the coefficient is not equal to 0. Subsequently, if the Huffman coding table of FIG. 7 is referred to using the coefficient value "5" as an Index Value, it can be seen that, from the Code column of the Huffman coding table, the coefficient value "5" is converted into a Huffman code "101" while the code bit length is 3 bits from the Code Length column. As a result, the coefficient value "5" is coded into "RUN0 SIZE3 Index 5

(="101")" as seen from the position ②  of FIG. 8d. Also as regards the coefficient value "3" at the position ③, it is similarly coded into "RUNO SIZE2 Index 3 (="11")".

Further, when the coefficient value "−1" is read out after the coefficient value "0" continues by two as at the position ④ of FIG. 8c, since the consecutive number of terms of the coefficient value "0" is 2, the RUN code representative of a consecutive number of terms of "0" is "RUN2". Then, if the Huffman coding table of FIG. 7 is referred to using the coefficient value "−1" as an Index Value, then it can be seen that, from the Code column, the coefficient value "−1" is converted into a Huffman code "0" while the bit length is 1 from the Code Length column. As a result, the coefficient train (0, 0, −1) at the position ④ of FIG. 8c is coded into "RUN2 SIZE1 Index −1 (="0")" as seen from the position ④ of FIG. 8d.

Further, when the coefficient value "0" continues to the last end of a block as at the position ⑧ of FIG. 8c, a special code EOB (End Of Block) representing that the coefficient value "0" continues to the last end of the block is added as seen from the position ⑧ of FIG. 8d.

The dc component and ac component coded in such a manner as described above are divided into blocks of such a predetermined format as seen from FIG. 8d by the signal combining circuit 510 and then sent to the communication circuit 7. The communication circuit 7 transmits compressed picture image data sent thereto from the signal combining circuit 510 as well as difference degree information sent thereto from the difference degree calculating circuit 606 which will be hereinafter described and representative of a degree of a change of a picture image and an identifier (for example, a video camera number) also sent thereto from the difference degree calculating circuit 606 and representative of a monitoring object area then to the receiving side terminal apparatus 2 by way of the communication channel 8.

Meanwhile, in parallel to such compressing processing of picture image data by the picture image data compressing section 5, such calculating processing of difference degree information representative of a degree of a change of the picture image of the monitoring object area as described below is executed by the picture image change detecting section 6.

In particular, the filter circuit 601 stores a Y signal transmitted thereto from the Y-C separating circuit 402 by way of the A/D converter 403 once into a frame memory not shown thereof. Then, such difference calculating processing as illustrated in FIG. 9 or 10 is applied to the picture element data for one frame thus stored to produce a difference picture image (edge picture image) of the picture image of the monitoring object area.

Figure 9:
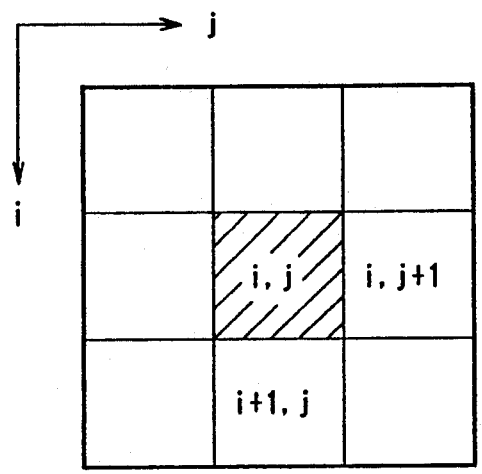
FIG. 9 is a diagrammatic view illustrating difference calculating processing.

According to the difference calculating processing illustrated in FIG. 9, when a picture element at the i-th position in the vertical direction and at the j-th position in the horizontal direction is determined as a processing object picture element y(i, j), a difference value Δy(i, j) of the processing object picture element y(i, j) is calculated in accordance with the following expression:

$$\Delta y(i,j) = y(i, j+1) + y(i+1, j) - 2y(i, j)$$

Figure 10:
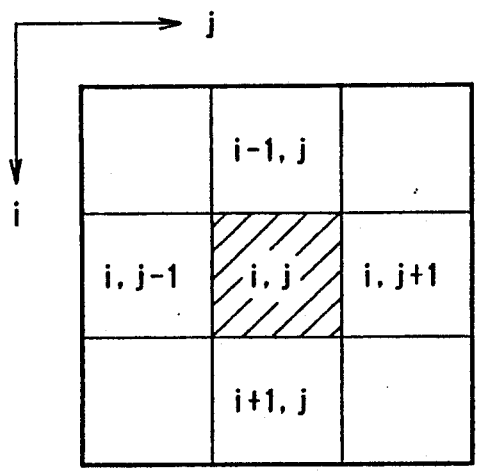
FIG. 10 is a similar view but illustrating another difference calculating processing.

Meanwhile, according the difference calculating processing illustrated in FIG. 10, which is called Laplachian processing, a difference value Δy(i, j) of the processing object picture element y(i, j) is calculated in accordance with the following expression:

$$\Delta y(i,j) = y(i-1, j) + y(i, j-1) + y(i, j+1) + y(i+1, j) - 4y(i, j)$$

It is to be noted that, in case a value of the difference value Δy(i, j) obtained in accordance with either of the expressions is in the negative, the value is replaced by 0.

A difference picture image of a monitoring object area obtained by the difference calculation processing of FIG. 9 or 10 described above is an edge picture image which is formed only from an edge or profile extracted as a picture image characteristic from an original picture image. The difference picture image of the monitoring object area obtained in this manner is sent to the binary digitizing circuit 603 and average value calculating circuit 602.

The average value calculating circuit 602 adds {ΣΔy(i, j)} difference values Δy(i, j) of individual picture elements of the difference picture image of the monitoring picture area for the entire screen and calculates a picture element density average value Δym of the difference picture image in accordance with the following expression:

$$\Delta ym = \{\Sigma \Delta y(i,j)\}/(\text{number of picture elements added})$$

The picture element density average value Δym obtained in this manner represents a degree at which picture element components are to be extracted from the monitoring object area then. When the value of the picture element density average value Δym is high, the number of picture element components to be extracted from the monitoring object area is generally high, but on the contrary when the value of the picture element density average value Δym is low, the number of picture element components to be extracted from the monitoring object area is generally low.

The binary digitizing circuit 603 converts a difference picture image transmitted thereto from the filter circuit 601 into a binary picture image consisting of the binary values of "1" and "0" using a picture element density average value Δym received from the average value calculating circuit 602 as a threshold value for the binary digitization, and sends the binary picture image to the noise component suppressing circuit 604.

Meanwhile, the variation calculating circuit 605 calculates, using a picture element density average value or values in the past stored in a memory not shown thereof and a picture element density average value at present transmitted thereto from the average value calculating circuit 602, a variation m of the picture element density average value at present with respect to the picture element density average value or values in the past in accordance with the following expression:

$$m = \{\text{current picture element density average value}\}/\{\text{average of picture element density average value or values in the past}\}$$

The variation m assumes m=1 when the amount of characteristic components to be extracted from the monitoring object area presents no change, but is m>1 when the amount presents an increase and m<1 when the amount presents a decrease.

The noise component suppressing circuit 604 removes noise components of a binary picture image. The noise removing processing is realized, in principle, by judging, preparing a mask of a predetermined size, for example, such a mask of a 3×3 picture element size as shown in FIG. 11 or 12, whether or not a picture element at the central position of the mask is a noise in accordance with a distributing condition of the binary values of "1" and "0" of picture elements around the central picture element. Such judging processing is performed displacing the mask one after another picture element from the left end to the right end of the upper end of the screen of the binary picture image, and after the right end is reached, the mask is displaced by one picture element distance downwardly in the vertical direction and then similar processing is repeated from the left end to the right end again until the lower end of the screen is reached.

Exemplary procedures of noise removing processing will be described with reference to FIGS. 11 and 12. It is to be noted that such noise removing processing is performed only when a central picture element of a mask is equal to "1".

① When only the central picture element is equal to "1" but all of the eight picture elements around the same are equal to "0":

The central picture element is regarded as a noise and replaced by "0". This is because, when only the central picture element is "1", it is considered to be an isolated point such as a noise.

② When three or more picture elements around the central picture element are equal to "1":

Since it is considered that the central picture element is not an isolated point such as a noise, it is left to be "1" as it is.

③ When only one picture element around the central picture element is equal to "1":

When the picture element of "1" is any one of picture elements at positions marked with ○ in FIG. 11a or 11b, the central picture element is left as it is, but in any other case, the central picture element is regarded as a noise and replaced by "0".

In the case of FIG. 11a, since the processing proceeds from the left top to the right bottom of the binary picture image, a picture element at a position marked with ○ is a determined picture element for which it has been judged whether or not it is a noise. Accordingly, when the picture element at a position marked with ○ is "1", probably the central picture element is a picture element of "1" connecting to such picture element.

On the other hand, in the case of FIG. 11b, a picture element at a position marked with ○ is a picture element for which it will thereafter be judged whether or not it is a noise, and when a picture element at a position marked with ○ is "1", probably the central picture element is an end point picture element of an edge connecting to the picture element at the position of ○.

④ When two picture elements around the central picture element are equal to "1":

When only any two of picture elements at positions marked with ○ are "1" as shown in FIG. 12a, the central picture element is left as it is, but otherwise, the central picture element is regarded as a noise and replaced by "0". The judgment principle of the case of FIG. 12a is similar to that of the case of FIG. 11a.

Further, when two of picture elements at positions marked with ○ are "1" as shown in any one of FIGS. 12b to 12d, the central picture element is left as it is, but otherwise, it is regarded as a noise and replaced by "0". This is intended, since a wrinkle of clothes which can be regarded as a noise upon picture processing appears in most cases as an edge line of an L-shape, to remove such edge line as a noise and extract only an edge line of an L-shape, which is present frequently on a profile of an article, as significant picture elements.

A binary picture image from which noises have been removed in such a manner as described above is sent to the difference degree calculating circuit 606, at which a difference degree representative of a degree of change of a picture image of a monitoring object area is calculated in such a manner as described below.

Figure 13:
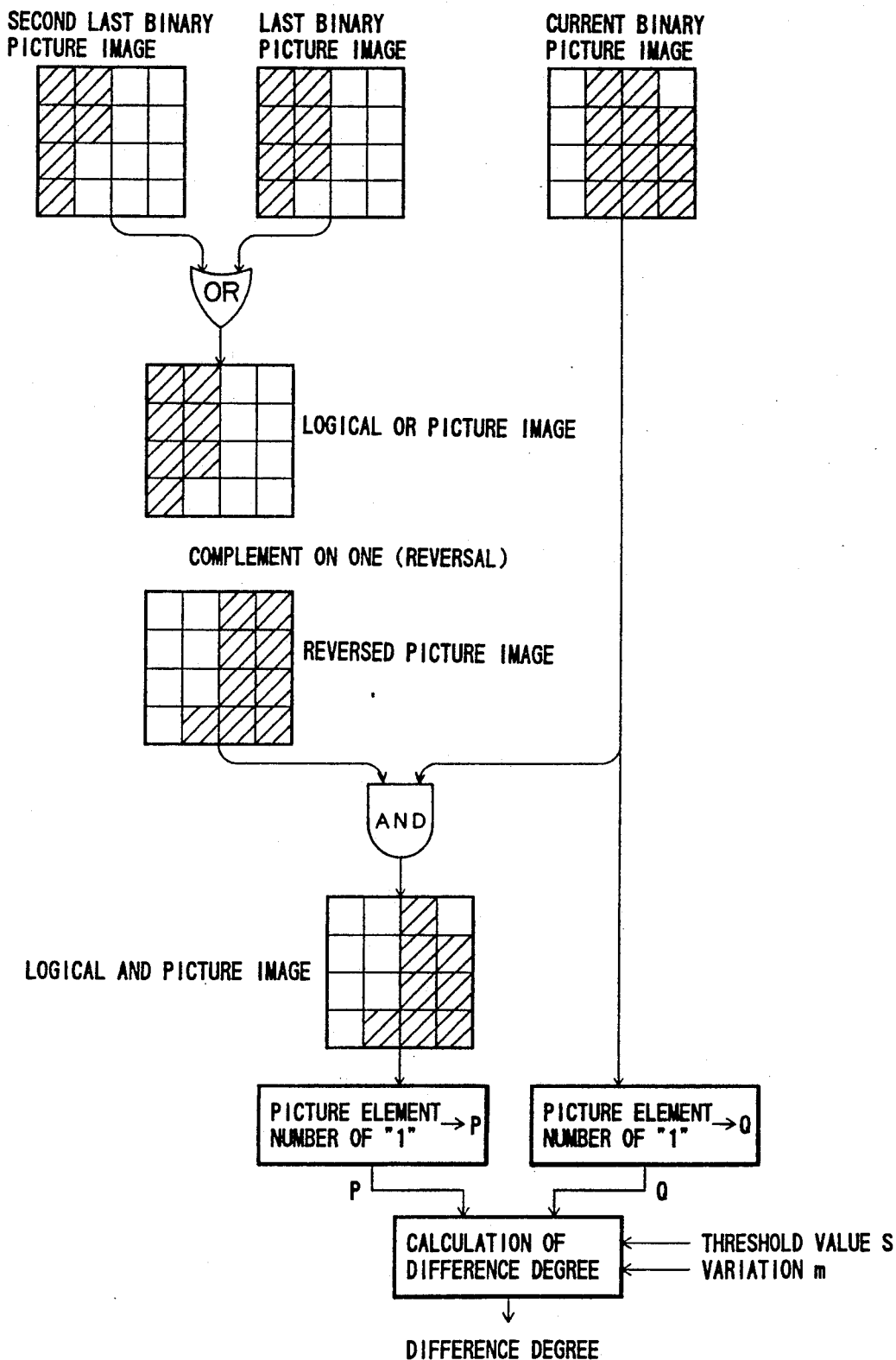
FIG. 13 is a diagrammatic view illustrating algorithm of difference degree calculating processing executed by a picture image change detecting section.
Figure 14:
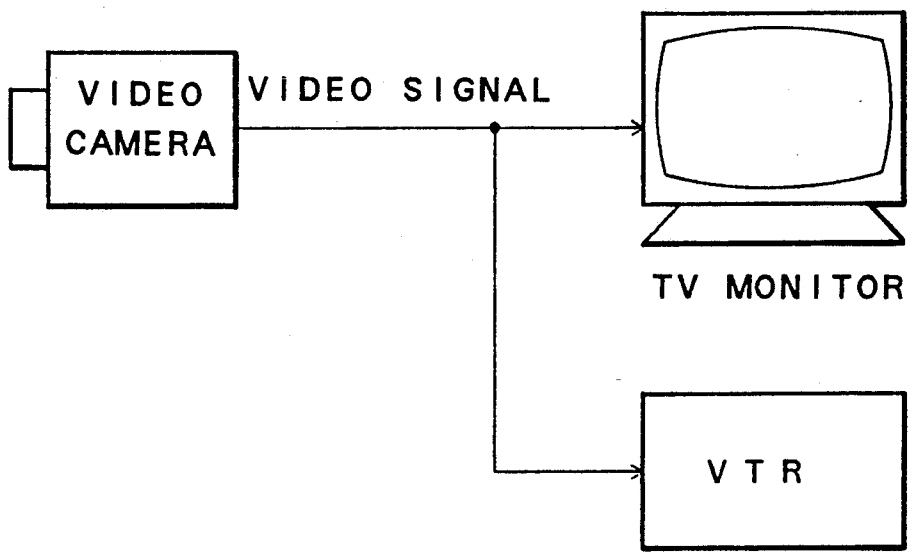
FIG. 14 is a diagrammatic representation showing an exemplary construction of a conventional monitoring camera system.

The algorithm in calculation of a difference degree of change of a picture image by the difference degree calculating circuit 606 is illustrated in FIG. 13. It is to be noted that FIG. 13 illustrates, for the simplification of description, a case wherein the screen of a binary picture image has a 4×4 picture element size and the picture image storage circuit 608 is constructed such that it stores therein two picture images including a binary picture image of the last frame of a monitoring object area and another binary picture image of the second last frame.

Referring to FIG. 13, first, a binary picture image of the last frame and another binary picture image of the second last frame are read out from the picture image storage circuit 608 and the two picture images are logically ORed, and then, a logical OR picture image thus obtained is reversed (complemented on one) to obtain a reverse picture image.

Subsequently, the reverse picture image and a binary picture image at present transmitted thereto from the noise component suppressing circuit 604 are logically ANDed to obtain a logical AND picture image. The logical AND picture image obtained in this manner is a binary picture image which consists only of those picture elements which were equal to "0" in picture element density in the binary picture image in the past but present a change in picture element density from "0" to "1" in the binary picture image at present.

The difference degree calculating circuit 606 counts a number of picture elements of "1" in the logical AND picture image. The thus counted picture element number is represented by P and indicates a total number of picture elements which present the change from "0" to "1" in the binary picture image of the monitoring object area at present. The difference degree calculating circuit 606 also counts a number of picture elements of "1" in the binary picture image at present. The thus counted picture element number is represented by Q and indicates a total number of picture elements of "1" in the binary picture image of the monitoring object area at present.

The difference degree calculating circuit 606 calculates a difference degree using the picture element number P by which picture elements have changed from "0" to "1", the total number Q of picture elements of "1" in the binary picture image of the monitoring area at present, a threshold value S for the judgment of a change of a picture image preset to the threshold value setting circuit 12 and the variation m of a picture element density average value transmitted thereto from the variation calculating circuit 605, in accordance with the following expression:

difference degree $= (P/m)/(S \times Q)$

It is to be noted that, in the expression above, the threshold value S specifies a ratio of picture elements which have changed from "0" to "1" and varies within the range of $S=0$ to 1.0 (0% to 100%). Meanwhile, as described hereinabove, the variation m is $m=1$ when the amount of characteristic components to be extracted from the monitoring object area does not present a change, but is $m>1$ when the amount presents an increase and $m<1$ when the amount presents a decrease.

The calculation expression for a difference degree given above has such significance as follows. First, as a basic principle, a value $(S \times Q)$ obtained by multiplication of the total number Q of picture elements of "1" in the binary picture image by the predetermined threshold value S is determined as a judgment boundary value for a change of a picture image, and a ratio $=P/(S \times Q)$ of the number P of picture elements which have changed from "0" to "1" to the boundary value $(S \times Q)$ is adopted as a difference degree of change of the picture image.

Accordingly, when a picture image has no change, since $P=0$, $P/(S \times Q)=0$, which indicates that, when the difference degree is 0, there is no change with the picture image. On the other hand, when $P=(S \times Q)$, that is, when the number P of picture elements which have changed from "0" to "1" is equal to the boundary value $(S \times Q)$, the difference degree is 1, and it can be regarded that there is a picture image change in the monitoring object area. As the picture element number P increases, the difference degree increases farther than 1. Accordingly, it can be identified from the value of the difference degree how much picture image change has occurred in the monitoring object area.

Further, in accordance with the present invention, upon such calculation of a difference degree as described above, the number P of picture elements which have changed from "0" to "1" is divided by the variation m of a picture element density average value indicative of a changing rate of characteristic components to be extracted from the monitoring object area to effect correction in accordance with the change of the characteristic components to be extracted from the monitoring object area. Such correction is performed from the following reason.

If the amount of characteristic components to be extracted from the monitoring object area, for example, increases from that in the past, the number of picture elements of "1" in the binary picture image of the monitoring object area at present increases in proportion to such increase. Accordingly, in logical ANDing processing as seen in FIG. 13, the binary picture image of the monitoring object area at present wherein the number of "1" has increased as the amount of characteristic components has increased and a reverse picture image of the picture image of the monitoring area in the past are logically ANDed.

Consequently, the logical AND picture image obtained includes a number P of picture elements which has increased from an original number of picture elements by a number by which characteristic components of the monitoring area have increased. A correct result of judgment cannot be obtained unless the number thus increased is cancelled. Thus, according to the present invention, the picture element number P is divided by the variation m of the picture element density average value of the binary picture image at present to return the picture element number P to its original picture element number. This makes it possible to find out an accurate difference degree of change of a picture image even if the amount of characteristic components of a monitoring object area changes.

Here, a difference degree in the case of the example of FIG. 13 will be calculated. The number P of picture elements of "1" of the logical AND picture image is 8, and the number Q of picture elements of "1" in the binary picture image at present is 11. Now, in case the threshold value S is set to $S=0.6$ (60%) and the variation m of a picture element density average value is $m=1$, that is, the amount of characteristic components of the monitoring object area presents no change, $(P/m)=8/1=8$ and $(S \times Q)=(0.6 \times 11)=6.6$, and the difference degree between them is $8/6.6 \div 1.2$. Since the difference degree is higher than 1, it can be recognized that there is a picture image change in the monitoring object area.

In the meantime, in case characteristic components of the monitoring object area have increased by 50% or so comparing with those in the past and the variation m of the picture element density average value is $m=1.5$, $(P/m)=8/1.5 \div 5$, and consequently, the difference degree is $5.3/6.6 \div 0.8$. Since the difference degree is lower than 1, it can be recognized that there is no picture image change in the monitoring object area.

The difference degree calculating circuit 606 sends difference degree information obtained in such a manner as described above and indicative of a degree of a picture image change of a monitoring object area and an identifier (for example, a video camera number) which specifies the monitoring object area then to the communication circuit 7.

The communication circuit 7 transmits, at a point of time when both of a series of compressed picture image data transmitted thereto from the picture image data compressing circuit 5 and difference degree information and an identifier from the picture image change detecting section 6 are all prepared, such received compressed picture image data, difference degree information and identifier to the receiving side terminal apparatus 2 by way of the communication channel 8.

Further, the communication circuit 7 receives predetermined controlling information transmitted thereto from the receiving side terminal apparatus 2 and executes predetermined picture image monitoring control in accordance with the received controlling information such that, for example, a selecting signal of the video signal selecting circuit 401 is fixed to one of the video cameras $3_1$ to $3_3$ which is photographing a monitoring object area in which there has been a picture image change so that either only a picture image of the monitoring object area in which the abnormal condition has occurred is transmitted or calculating processing of a difference degree by the difference degree calculating circuit 606 is stopped after a picture image change has occurred while only a picture image of the monitoring object area is transmitted.

It is to be noted that, after the series of difference degree calculating processing is completed, a picture element density average value or values in the past stored in the variation calculating circuit 605 and a binary picture image or images in the past stored in the picture image storage circuit 608 are updated to be prepared for next processing.

Referring now to FIG. 3, the receiving side terminal apparatus shown has a similar fundamental construction to that of the receiving side terminal apparatus 2 of the picture image monitoring apparatus shown in FIG. 1. Thus, the receiving side terminal apparatus includes a communication circuit 9, a compressed data decoding section 10, a TV monitor 11 constituting a picture image displaying section and a controlling information generating section 12. The receiving side terminal apparatus additionally includes a signal discriminating section 13 and a picture image recording video tape recorder (VTR) 14.

The signal discriminating circuit 13 receives data from the communication circuit 9 which receives such data from the transmitting side terminal apparatus 1 by way of the communication channel 8. The signal discriminating circuit 13 separates the received data into compressed picture image data and the other data than the compressed picture image data and transmits the compressed picture image data to the compressed data decoding section 10 while it transmits difference degree information and an identifier to the controlling information generating section 12.

The compressed data decoding section 10 includes a conversion coefficient separating circuit 101 for separating a dc component and ac components of received compressed picture image data from each other, a reverse differential PCM circuit 102 for changing a dc component back into an original value, a Huffman decoding circuit 103 for decoding an ac component into an original value, a Huffman decoding table 104, a zero unpacking circuit 105 for changing a sequence of terms of the coefficient 0 to an original value or values, a coefficient order changing circuit 106, a dequantizing circuit 107, a Y-component dequantization table 108, a C-component dequantization table 109, a two-dimensional IDCT circuit 110 for performing two-dimensional reverse cosine conversion, and a Y-C composing circuit 111 for composing decoded Y and C components to reproduce an original video signal (color composite signal).

In operation, compressed picture image data of a monitoring object area as well as difference degree information and an identifier transmitted from the transmitting side terminal apparatus 1 by way of the transmission line 8 are received by the communication circuit 9 and then sent to the signal discriminating circuit 13. The signal discriminating circuit 13 sends the compressed picture image data in the received data to the compressed data decoding section 10 and sends the difference degree information and identifier to the controlling information generating section 12.

The compressed data decoding section 10 receiving the compressed data thus executes decoding processing of the compressed picture image data in the following manner.

In particular, the conversion coefficient separating circuit 101 separates a dc component and ac components of the compressed data (refer to FIG. 8d) from each other and sends the dc component to the reverse differential PCM circuit 102 while it sends the ac components to the Huffman decoding circuit 103.

The reverse differential PCM circuit 102 adds a DPCM value of the dc component transmitted thereto from the conversion coefficient separating circuit 101 to another DPCM value of a dc component of the last block to find out a conversion coefficient of an original dc component. Meanwhile, the Huffman decoding circuit 103 decodes the ac components into an original conversion coefficient referring to the Huffman decoding table 104 while the zero unpacking circuit 105 decodes a term of the conversion coefficient 0 into an original coefficient train.

The conversion coefficients of the dc component and ac components decoded into original values in such a manner as described above are individually sent to the coefficient order changing circuit 106, at which the order of them is re-arranged by zigzag scanning so that they are decoded back into an original block of $8 \times 8 = 64$ conversion coefficients shown in FIG. 6.

The 64 conversion coefficients for each of the Y and C components returned into original conversion coefficient blocks are sent to the dequantizing circuit 106, at which the 64 conversion coefficients for the Y and C components are multiplied by values at corresponding positions of the Y component dequantizing table 108 and C component dequantizing table 107, respectively, so that they are individually returned into original $8 \times 8 = 64$ conversion coefficients F (u, v) before quantization.

The conversion coefficients F (u, v) undergo two-dimensional reverse cosine conversion in accordance with the following expression for each of the Y component and C component by the two-dimensional IDCT circuit 110 so that they are returned into an original signal f(i, j).

$$f(i, j) = \frac{1}{4} \sum_{u=0}^{7} \sum_{v=0}^{7} C(u) F(u, v) \cdot \cos\left\{ (2i + 1) \cdot \frac{v\pi}{16} \right\} \times \cos\left\{ (2j + 1) \cdot \frac{v\pi}{16} \right\}$$

The Y and C signals individually returned into original signals f(i, j) on the time base in this manner are composed into an original video signal (color composite signal) by the Y-C composing circuit 111 and then sent to the TV monitor 111 serving as a picture image displaying section and also to the VTR 14. After then, the processing described so far is repeated until the received compressed picture image data no more remain.

Meanwhile, the controlling information generating section 12 produces predetermined controlling information in accordance with difference degree information and an identifier transmitted thereto from the signal discriminating circuit 13 to effect predetermined control of the TV monitor 11 serving as a picture image displaying section and the VTR 13 and sends controlling information to the transmitting side terminal apparatus 1 to effect predetermined control.

For example, the controlling information generating section 12 controls on/off operations of switches not shown of the TV monitor 11 and the VTR 14 so that, when some picture image change occurs in a monitoring object area, the picture image of the monitoring object area is automatically displayed on the TV monitor 11 and the picture image is recorded by the VTR 14.

Further, the controlling information generating section 12 controls the transmitting side terminal apparatus 1 such that, for example, it controls the video signal selecting circuit 401 so that only a video signal of a monitoring object area in which a picture image change has occurred is transmitted and, further, at a point of time when the picture image change occurs, a difference degree calculating operation of the difference degree calculating circuit 606 is stopped, whereafter it instructs so that only picture image data may be transmitted to the receiving side terminal apparatus 2 side.

It is to be noted that, while the embodiment described above is constructed such that a color composite signal is employed as a picture image signal, naturally it can be realized similarly where a monochromatic signal is employed. In this instance, those circuits which relate to a C (color difference) component in FIGS. 2 and 3 can be omitted.

Further, while two-dimensional DCT is adopted for the compression of picture image data in the embodiment described above, the present invention is not limited to such two-dimensional DCT, but any other picture image compressing technique may be adopted.

Further, while the filter circuit 601 of FIG. 2 adopts difference calculation to extract a high frequency component, optimum filtering processing may be adopted in accordance with a purpose of the monitoring of a picture image such as low frequency component extraction or band component extraction.

Further, while a variation m of a picture element density average value at the variation amount calculating circuit 605 is calculated as a ratio to an average of picture element density average values of a plurality of frames in the past, a substantially mid value or a most frequent value of such picture element density average values of a plurality of frames in the past may be used to find out such ratio in order to simplify processing.

Further, while the difference value calculating circuit 606 makes use of a variation m of a picture element density average value as it is directly for calculating processing of a difference degree, it is also possible to effect finer calculating processing by numerical value conversion in accordance with a function making use of such variation m as a variable such as stepwise increasing or decreasing of the variation or fixation of the variation to a fixed value when the variation exceeds a certain value.

Further, controlling information of the controlling information generating section 12 of FIG. 3 may be produced, after difference degree information is displayed once on a display to inform a watchman of such information, in accordance with an instruction of the watchman, or alternatively, the controlling information generating section 12 may automatically perform all operations without relying upon a watchman. Where all operations are performed automatically, whether or not there has been a change of a picture image of a monitoring object area should be detected depending upon whether or not the difference degree received from the transmitting side terminal apparatus 1 exceeds "1" as described hereinabove. Further, it is also possible to inform a watchman of occurrence of an abnormal condition making use of such controlling information or by acoustic or optical alarming means.

Having now fully described the invention, it will be apparent to one of ordinary skill in the art that many changes and modifications can be made thereto without departing from the spirit and scope of the invention as set forth herein.

What is claimed is:

1. A picture image monitoring system, comprising a transmitting side terminal apparatus and a receiving side terminal apparatus connected to each other by way of a communication channel;

said transmitting side terminal apparatus including:

a plurality of image pickup means for respectively photographing individual monitoring object areas and generating a plurality of respective picture image signals;

a picture image signal selecting section for selecting one of said plurality of picture image signals of the monitoring object areas photographed by a respective one of said plurality of image pickup means;

a picture image data compressing section for compressing the one picture image signal selected by said picture image signal selecting section;

a picture image change detecting section for detecting, from the one picture image signal selected by said picture image signal selecting section, a change of the one picture image signal of the monitoring object area, and for producing difference degree information indicative of a degree of a difference of the one picture image signal and producing an identifier which specifies the monitoring object area corresponding to the one picture image signal; and a communication circuit for transmitting the difference degree information, the identifier outputted from said picture image change detecting section, and the compressed picture image data of a monitoring object area outputted from said picture image data compressing section to said receiving side terminal apparatus by way of said communication channel, and for receiving controlling information for selection of the picture image data to be transmitted by way of said communication channel;

said receiving side terminal apparatus including:

a communication circuit for receiving difference degree information and an identifier as well as compressed picture image data of a monitoring object area transmitted thereto from said transmitting side terminal apparatus by way of said communication channel and for transmitting controlling information for selection of the picture image to be transmitted by way of said communication channel;

a compressed data decoding section for decoding compressed picture image data received from said communication circuit into an original picture image;

a controlling information generating section for producing predetermined controlling information for selection of the picture image data to be transmitted in accordance with difference degree information and an identifier received from said communication circuit; and a picture image displaying section for displaying the picture image signal of a monitoring object area decoded by said compressed data decoding section in accordance with controlling information outputted from said controlling information generating section.

2. A picture image monitoring system as claimed in claim 1, wherein said receiving side terminal apparatus further includes recording means for recording an original picture image from said compressed data decoding section onto a record medium in accordance with controlling information from said controlling information generating section.

3. A picture image monitoring system, comprising a transmitting side terminal apparatus and a receiving side terminal apparatus connected to each other by way of a communication channel;

said transmitting side terminal apparatus including;

a plurality of image pickup means for respectively photographing individual monitoring object areas and generating a plurality of respective picture image signals;

a picture image signal selecting section for selecting one of said plurality of picture image signals of the monitoring object areas photographed by a respective one of said plurality of image pickup means;

a picture image data compressing section for compressing the one picture image signal selected by said picture image signal selecting section;

a picture image change detecting section for detecting, from the one picture image signal selected by said picture image signal selecting section, a change of the one picture image signal of the monitoring object area, and for producing difference degree information indicative of a degree of a difference of the one picture image signal and producing an identifier which specifies the monitoring object area corresponding to the one picture image signal; and a communication circuit for transmitting the difference degree information, the identifier outputted from said picture image change detecting section, and the compressed picture image data of a monitoring object area outputted from said picture image data compressing section to said receiving side terminal apparatus by way of said communication channel, and for receiving controlling information for selection of the picture image data to be transmitted by way of said communication channel;

said receiving side terminal apparatus including:

a communication circuit for receiving difference degree information and an identifier as well as compressed picture image data of a monitoring object area transmitted thereto from said transmitting side terminal apparatus by way of said communication channel and for transmitting controlling information for selection of the picture image to be transmitted by way of said communication channel:

a compressed data decoding section for decoding compressed picture image data received from said communication circuit into an original picture image;

a controlling information generating section for producing predetermined controlling information for selection of the picture image data to be transmitted in accordance with difference degree information and an identifier received from said communication circuit; and a picture image displaying section for displaying the picture image signal of a monitoring object area decoded by said compressed data decoding section in accordance with controlling information outputted from said controlling information generating section.

wherein said receiving side terminal apparatus further includes a signal discriminating circuit for receiving data from said communication circuit of said receiving side terminal apparatus and separating the received data into compressed picture image data to be transmitted to said compressed data decoding section and difference degree information and an identifier to be transmitted to said controlling information generating section.

4. A picture image monitoring system, comprising a transmitting side terminal apparatus and a receiving side terminal apparatus connected to each other by way of a communication channel:

said transmitting side terminal apparatus including:

a plurality of image pickup means for respectively photographing individual monitoring object areas and generating a plurality of respective picture image signals;

a picture image signal selecting section for selecting one of said plurality of picture image signals of the monitoring object areas photographed by a respective one of said plurality of image pickup means;

a picture image data compressing section for compressing the one picture image signal selected by said picture image signal selecting section;

a picture image change detecting section for detecting, from the one picture image signal selected by said picture image signal selecting section, a change of the one picture image signal of the monitoring object area, and for producing difference degree information indicative of a degree of a difference of the one picture image signal and producing an identifier which specifies the monitoring object area corresponding to the one picture image signal; and a communication circuit for transmitting the difference degree information, the identifier outputted from said picture image change detecting section, and the compressed picture image data of a monitoring object area outputted from said picture image data compressing section to said receiving side terminal apparatus by way of said communication channel, and for receiving controlling information for selection of the picture image data to be transmitted by way of said communication channel;

said receiving side terminal apparatus including;

a communication circuit for receiving difference degree information and an identifier as well as compressed picture image data of a monitoring object area transmitted thereto from said transmitting side terminal apparatus by way of said communication channel and for transmitting controlling information for selection of the picture image to be transmitted by way of said communication channel;

a compressed data decoding section for decoding compressed picture image data received from said communication circuit into an original picture image;

a controlling information generating section for producing predetermined controlling information for selection of the picture image data to be transmitted in accordance with difference degree information and an identifier received from said communication circuit; and a picture image displaying section for displaying the picture image signal of a monitoring object area decoded by said compressed data decoding section in accordance with controlling information outputted from said controlling information generating section.

wherein said picture image change detecting section of said transmitting side terminal apparatus includes a filter circuit for applying predetermined filtering processing to the one picture image signal selected by said picture image signal selecting section to extract a predetermined picture image characteristic of the picture image signal, an average value calculating circuit for calculating a picture element density average value of an extracted characteristic picture image from said filter circuit, a binary digitizing circuit for converting an extracted characteristic picture image from said filter circuit into a binary picture image using a picture element density average value calculated by said average value calculating circuit as a threshold value, a variation calculating circuit for calculating a variation of a picture element density average value of a picture image at present from another picture element density average value of the picture image in the past, and a difference degree calculating circuit for producing difference degree information and an identifier in accordance with a binary picture image from said binary digitizing circuit, a variation from said variation calculating circuit and a picture image from said picture image signal selecting section.

5. A picture image monitoring system as claimed in claim 4, wherein said picture image change detecting section of said transmitting side terminal apparatus further includes a picture image storage circuit for storing therein at least one binary picture image of a frame from said binary digitizing circuit.

6. A picture image monitoring system as claimed in claim 4, wherein said picture image change detecting section of said transmitting side terminal apparatus further includes a noise component suppressing circuit interposed between said binary digitizing circuit and difference degree calculating circuit for removing noise components from a binary picture image from said binary digitizing circuit.

7. A picture image monitoring system as claimed in claim 4, wherein said picture image change detecting section of said transmitting side terminal apparatus further includes a threshold value setting circuit for setting a threshold value S, and wherein said difference degree calculating circuit calculates a difference degree using a picture element number P by which picture elements of a binary picture image from said binary digitizing circuit have changed from "0" to "1" of the binary values, a total number Q of picture elements of "1" in such binary picture image at present, a variation m of a picture element density average value from said variation calculating circuit and the threshold value S from said threshold value setting circuit, in accordance with the following expression:

$$\text{difference degree} = (P/m)/(S \times Q)$$

* * * * *